(12) United States Patent
Billman et al.

(10) Patent No.: US 11,080,740 B2
(45) Date of Patent: Aug. 3, 2021

(54) LISTENING APPLICATION ON A MOBILE DEVICE TO LIMIT MULTIPLE REDEMPTIONS OF AN OFFER

(71) Applicant: Comenity LLC, Columbus, OH (US)

(72) Inventors: Christian Billman, Gahanna, OH (US); Uchenna Chilaka, Gahanna, OH (US)

(73) Assignee: Comenity LLC, Columbus, OH (US)

( * ) Notice: Subject to any disclaimer, the term of this patent is extended or adjusted under 35 U.S.C. 154(b) by 72 days.

(21) Appl. No.: 15/987,118

(22) Filed: May 23, 2018

(65) Prior Publication Data

US 2019/0130428 A1 May 2, 2019

Related U.S. Application Data

(60) Provisional application No. 62/578,284, filed on Oct. 27, 2017.

(51) Int. Cl.
*G06Q 30/02* (2012.01)
*G06F 16/632* (2019.01)
*G06F 16/635* (2019.01)

(52) U.S. Cl.
CPC ....... *G06Q 30/0225* (2013.01); *G06F 16/634* (2019.01); *G06F 16/635* (2019.01); *G06Q 30/0235* (2013.01)

(58) Field of Classification Search
CPC . G06Q 30/02; G06Q 30/0225; G06Q 30/0235
See application file for complete search history.

(56) References Cited

U.S. PATENT DOCUMENTS

| | | | | |
|---|---|---|---|---|
| 2012/0136698 | A1* | 5/2012 | Kent | G06Q 20/387 705/14.1 |
| 2016/0196577 | A1* | 7/2016 | Reese | H04W 4/023 705/14.5 |
| 2018/0157884 | A1* | 6/2018 | Visentin | G06Q 50/01 |
| 2018/0321905 | A1* | 11/2018 | Fountaine | G06F 3/167 |
| 2018/0341891 | A1* | 11/2018 | Setchell | G06Q 10/06 |

OTHER PUBLICATIONS

Shankar et al., "Mobile marketing in the retailing environment: current insights and future research avenues" (published in The Journal of Interactive Marketing, pp. 111-120, May 2010) (Year: 2010).*

* cited by examiner

*Primary Examiner* — Abhishek Vyas
*Assistant Examiner* — Patrick Kim

(57) ABSTRACT

Methods and systems for utilizing a listening application on a mobile device to limit multiple redemptions of an offer are disclosed. The method stores a listening application on a mobile device. One or more processors access an offer. The one or more processors open the listening application when the offer is accessed and access a microphone of the mobile device. The offer is then presented on a display of the mobile device. The listening application listens for one or more sounds occurring in an environment about the mobile device. A database of sound files is accessed and a comparing occurs between the one or more sounds occurring in the environment with one or more sound files in the database of sound files. When it is determined, based on the comparing, that a successful scanning sound has been heard the offer is expired.

12 Claims, 10 Drawing Sheets

200

```
┌─────────────────────────────────────────────────────────────────┐
│  STORES, AT A MEMORY OF A MOBILE DEVICE, A LISTENING APPLICATION │
│                              205                                  │
└─────────────────────────────────────────────────────────────────┘
                                 ▼
┌─────────────────────────────────────────────────────────────────┐
│   ACCESSES, WITH ONE OR MORE PROCESSORS, THE OFFER ON THE MOBILE DEVICE │
│                              210                                  │
└─────────────────────────────────────────────────────────────────┘
                                 ▼
┌─────────────────────────────────────────────────────────────────┐
│  OPENS, WITH THE ONE OR MORE PROCESSORS, THE LISTENING APPLICATION WHEN │
│                    THE OFFER IS ACCESSED                          │
│                              215                                  │
└─────────────────────────────────────────────────────────────────┘
                                 ▼
┌─────────────────────────────────────────────────────────────────┐
│  ACCESSES, WITH THE ONE OR MORE PROCESSORS, A MICROPHONE OF THE MOBILE │
│                              DEVICE                               │
│                              220                                  │
└─────────────────────────────────────────────────────────────────┘
                                 ▼
┌─────────────────────────────────────────────────────────────────┐
│           PRESENTS THE OFFER ON A DISPLAY OF THE MOBILE DEVICE   │
│                              225                                  │
└─────────────────────────────────────────────────────────────────┘
                                 ▼
┌─────────────────────────────────────────────────────────────────┐
│  LISTENS, VIA THE MICROPHONE, FOR ONE OR MORE SOUNDS OCCURRING IN AN │
│                 ENVIRONMENT ABOUT THE MOBILE DEVICE               │
│                              230                                  │
└─────────────────────────────────────────────────────────────────┘
                                 ▼
┌─────────────────────────────────────────────────────────────────┐
│  ACCESSES, WITH THE ONE OR MORE PROCESSORS, A DATABASE OF SOUND FILES, │
│  EACH SOUND FILE IN THE DATABASE OF SOUND FILES COMPRISING: A SOUND; AND │
│          AN IDENTIFIER TAG TO IDENTIFY THE SOUND                  │
│                              235                                  │
└─────────────────────────────────────────────────────────────────┘
                                 ▼
┌─────────────────────────────────────────────────────────────────┐
│   COMPARES, WITH THE ONE OR MORE PROCESSORS, THE ONE OR MORE SOUNDS │
│   OCCURRING IN THE ENVIRONMENT WITH ONE OR MORE SOUND FILES IN THE │
│                      DATABASE OF SOUND FILES                      │
│                              240                                  │
└─────────────────────────────────────────────────────────────────┘
                                 ▼
┌─────────────────────────────────────────────────────────────────┐
│   DETERMINES, WITH THE ONE OR MORE PROCESSORS AND BASED ON THE    │
│    COMPARING, THAT A SUCCESSFUL SCANNING SOUND HAS BEEN HEARD     │
│                              245                                  │
└─────────────────────────────────────────────────────────────────┘
                                 ▼
┌─────────────────────────────────────────────────────────────────┐
│  EXPIRES, WITH THE ONE OR MORE PROCESSORS, THE OFFER ON THE MOBILE DEVICE │
│  WHEN IT IS DETERMINED THAT THE SUCCESSFUL SCANNING SOUND HAS BEEN │
│                              HEARD                                │
│                              250                                  │
└─────────────────────────────────────────────────────────────────┘
```

LISTENING APPLICATION ON A MOBILE DEVICE TO LIMIT MULTIPLE REDEMPTIONS OF AN OFFER

CROSS-REFERENCE TO RELATED APPLICATIONS (PROVISIONAL)

This application claims priority to and benefit of U.S. Provisional Patent Application No. 62/578,284 filed on Oct. 27, 2017, entitled "LISTENING APPLICATION ON A MOBILE DEVICE TO LIMIT MULTIPLE REDEMPTIONS OF AN OFFER" by Christian Billman et al and assigned to the assignee of the present application, the disclosure of which is hereby incorporated herein by reference in its entirety.

BACKGROUND

Presently, to maintain liability limitations, when an offer is provided to a customer there is a need to make sure the offer is only redeemed once. When the offer is provided on printed media, e.g., a mailer, newspaper coupon, etc., the retailer will take the printed media that includes the offer after it is redeemed. Often, the retailer will keep (or destroy) the media upon which the offer is printed. This will ensure that an offer is only redeemed once. In so doing, the retailer can be reasonably certain of the liability for any given offer. This is especially important when the offer is customer specific, e.g., reward bucks, earned coupon with abnormal discount, etc. Taking the offer after the customer redeems it ensures that the offer cannot be re-used or recycled to another customer. When the offer is provided digitally, it can be very difficult to ensure the offer is only redeemed once since the digital offer can be forwarded, shared, redeemed by a user and then kept for a second redemption, and the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 2 is a flowchart of a method for utilizing a listening application on a mobile device to limit multiple redemptions of an offer, in accordance with an embodiment.

FIG. 8 is a table of different use cases that include the condition, the use case and the probability of coupon/code redemption, in accordance with an embodiment.

DESCRIPTION OF EMBODIMENTS

Figure 1:
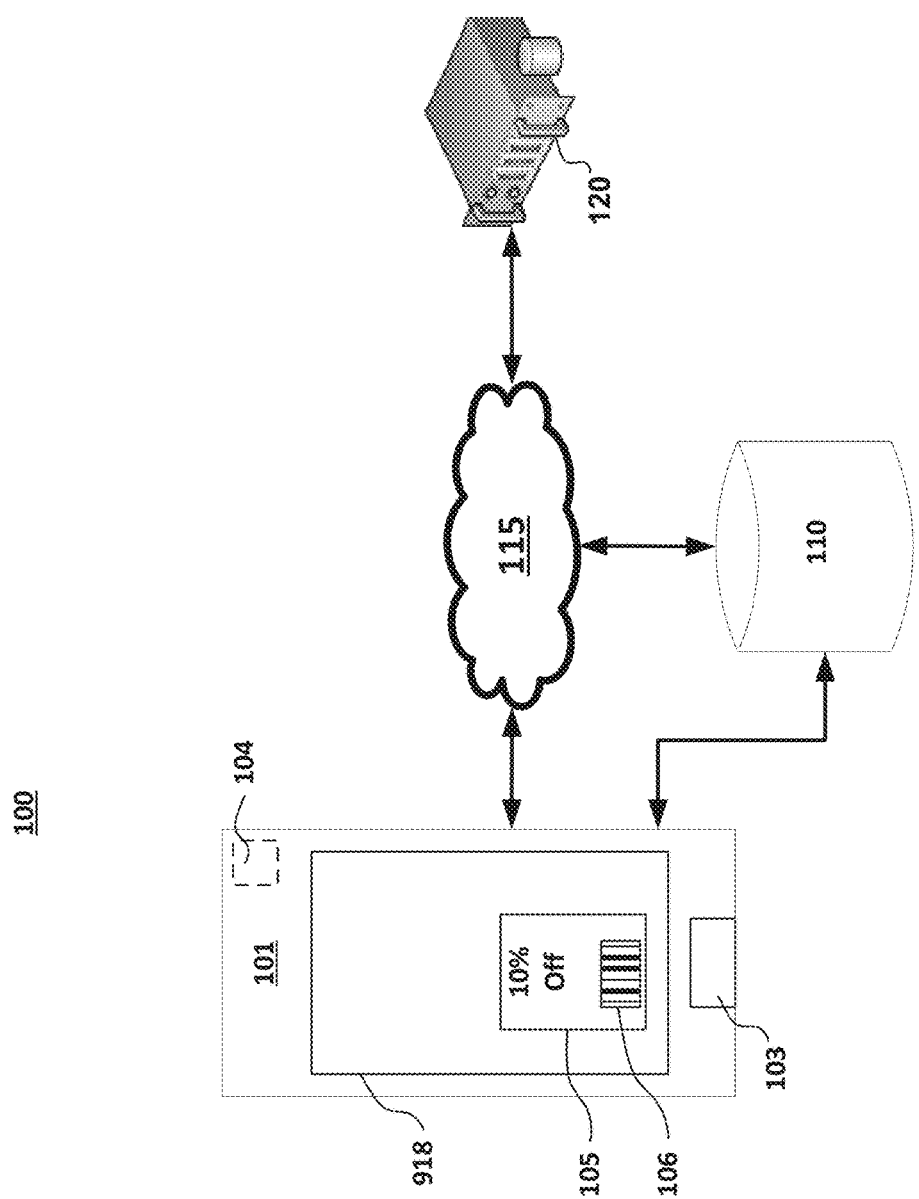
FIG. 1 is a block diagram of a system to limit multiple redemptions of an offer, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "determining", "collecting", "combining", "prescreening", "developing", "presenting", "initiating", "resetting", or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview

Retailers who are partnered with loyalty program providers produce bulk loyalty coupons to their customers as reward certificates. These reward certificates are meant to be used only once per transaction. However, due to Retailer systems' inability to produce a single targeted coupon code to each eligible customer, they produce coupons with same "coupon code" for many consumers. This can results in abuse of reward certificates, e.g., unintended sharing, multiple redemption, etc. The printed coupons (or reward certificates) are mostly demanded in origin by associates and retained after the transaction to limit multiple usages of same coupon code by a consumer.

The present mobile app has a feature to show these reward certificates and Mobile Virtual Cards after successful login. However, marking these reward certificates as used immediately after scanning is a challenge as coupon code scanning systems (owned by retailers) are not directly connected with the loyalty program's mobile account center or platform. As a result some mobile reward certificates meant for the single transaction use can be used for multiple sales.

A listening application on a mobile device that is used to limit multiple redemptions of an offer is discussed herein. In general, reward certificate, sales promotions, coupons, percentage discounts, reward dollar amounts, etc. are referred to hereinafter as "offers". The offers discussed herein are offers that are presented at the POS on a display of a user's mobile device. The offers can include an image such as a scanable code (e.g., barcode, universal product code (UPC), international article number (EAN), quick response code (QR), 2D barcode, Datamatrix code, Aztec code, and the like) to allow the offer to be presented on the display of the user's mobile device and scanned by a scanning device at the point of sale (POS).

Importantly, the embodiments of the present invention, as will be described below, provide a method and system for a listening application on a mobile device to limit multiple redemptions of an offer which differs significantly from the conventional offer redemption processes. In conventional approaches, to maintain liability limitations, when the offer is provided on printed media, e.g., a mailer, newspaper coupon, etc., the retailer will take the offer containing the scanable code and then after it is scanned, the retailer will keep (or destroy) the media upon which the scanable code is printed. This will ensure that an offer is only redeemed once.

However, if the offer is on a mobile device, such as provided via a text, email, photo of the scanable code, etc. one way for the retailer to limit the use of the code is to make the offer a unique code for each provided offer. However, this can be expensive and can require significant upgrades to present POS technology. Yet, without the unique code on each offer, a user could redeem the same offer at a different store, at the same store during a different checkout, digitally share the offer with a friend or friends (e.g., via text, screenshot, social media, etc.), and the like. Thus, the liability for the entity providing the offer may not be limited. For example, if a thousand dollar budget is set and a 10 dollar offer is provided to 100 people, without any type of control over the redemption of the 10 dollar offer, any or all of the 100 people could use the offer multiple times, email/text/message the offer to friends, provide it on a website, etc. In so doing, the liability for the entity providing the offer could easily and quickly surpass the 1000.00 dollar budget and end up costing hundreds or thousands of dollars more than what was intended.

However, the present embodiments, as will be described and explained below in detail, provide a previously unknown procedure for utilizing a listening application on a mobile device to limit multiple redemptions of an offer that is presented on a mobile device. For example, when scanning the offer, whether it is on the mobile device or on another type of indicia, the scanning device at the point of sale (POS) will make a sound. In general, the sound is taken from a library of scanner sounds that are normally utilized in the retail environment. For example, one scanner sound is a "positive" sound used to signal the store associate (or the customer if the scanning is being performed at a self-checkout station) that the scan was satisfactorily completed.

When the listening application hears a scanner sound (e.g., a sound generated due to the actions of a scanning device) it will compare the scanner sound with a library of scanner sounds. For example, the application would access a database having the same scanner sounds and their associated identifiers as those used in the retail environment. When a match is made between the heard scanner sound and the database of scanner sounds, the identifier for the matching scanner sound will be returned. The identifier will indicate the result of the scan and that result will be used by the listening application. For example, a "negative" sound will cause the listening application to not expire the offer. In contrast, a "positive" sound will cause the listening application to begin the expiration process for the offer, as described in further detail herein.

Thus, embodiments of the present invention provide a streamlined method for limiting multiple redemptions of an offer which extends well beyond what was previously done and which provides a significant improvement to the way a computer system deals with digital offers, redemption of the offers, reduction in abuse of the offers, and tracking a specific transaction that is associated with the offer redemption. The solution further provides a novel method for limiting multiple redemptions of an offer that utilizes ambient environment sounds to determine the environment in which the offer was displayed and utilize environment characteristics to expire the offer, set a timer for expiration of the offer, or maintain the validity of the offer. Further, the technology described herein allows the solution to be used in conjunction with a mobile loyalty application that will allow a retailer to track the offer redemption which will reduce misuse of the offer, reuse of a one-time offer, and the like, while allowing the retailer to maintain legacy point of sale (POS) systems and not have to invest in new POS systems, POS upgrades, or the like. As such, the solution will allow an improvement in retailer offer liability without deleteriously affecting the customer's normal purchase routine or the retailer's normal POS system.

As will be described in detail, the various embodiments of the present invention do not merely implement conventional data acquisition processes on a computer. Instead, the various embodiments of the present invention, in part, provide a previously unknown procedure for limiting multiple redemptions of an offer. Hence, embodiments of the present invention provide a novel process for limiting multiple redemptions of an offer which is necessarily rooted in computer technology to overcome a problem specifically arising in the realm of retail offer liability and redemption.

Moreover, the embodiments do not recite a mathematical algorithm; nor do they recite a fundamental economic or longstanding commercial practice. Instead, they address a real-world challenge, liability and redemption tracking for an offer that is presented on a mobile device. Further, by using the technology as described, the offer can be presented by a loyalty application on the mobile device having the listening application linked therewith, the redemption of the offer can be established based on the sounds heard by the listening application, in addition, aspects such as time, date, location, and the like can be linked with the redemption to provide a complete record of the offer redemption. In addition, the listening application can be used to further determine that a successful mobile transaction/payment has occurred. The time, date, location, and the like of the successful mobile transaction can be used for metric data regarding customer purchase habits, fraud analysis and/or detection, applying customer rewards, and the like.

It should be appreciated that the obtaining or accessing of user information conforms to applicable privacy laws (e.g., federal privacy laws, state privacy laws, etc.) and applicable fair credit reporting act laws. In one embodiment, prior to accessing user information, the user affirmatively "opts-in" to the services described herein. For example, prior to the initial operation of the listening application, the user is prompted with a choice to affirmatively "opt-in" to various services. As a result, any information is obtained with the user's prior permission.

Operation

Referring now to FIG. 1, a block diagram of a system 100 to limit multiple redemptions of an offer is shown in accordance with an embodiment. System 100 includes a mobile device 101, a database 110 of sound files, a network 115, and a server 120.

Mobile device 101 may be a mobile phone, a smart phone, a tablet, a smart watch, a piece of smart jewelry, smart glasses, and/or other electronic devices having wireless connectivity. That is, mobile device 101 would be capable of broadcasting and receiving via at least one network 115, such as, but not limited to, WiFi, Cellular, Bluetooth, NFC, and the like. In one embodiment, mobile device 101 may have a positioning determining system 104 such as a GPS or the like. In one embodiment, mobile device 101 is able to determine location within a given radius, such as the broadcast range of a beacon, WiFi hotspot, overlapped area covered by a plurality of mobile telephone signal providers, or the like.

Figure 9:
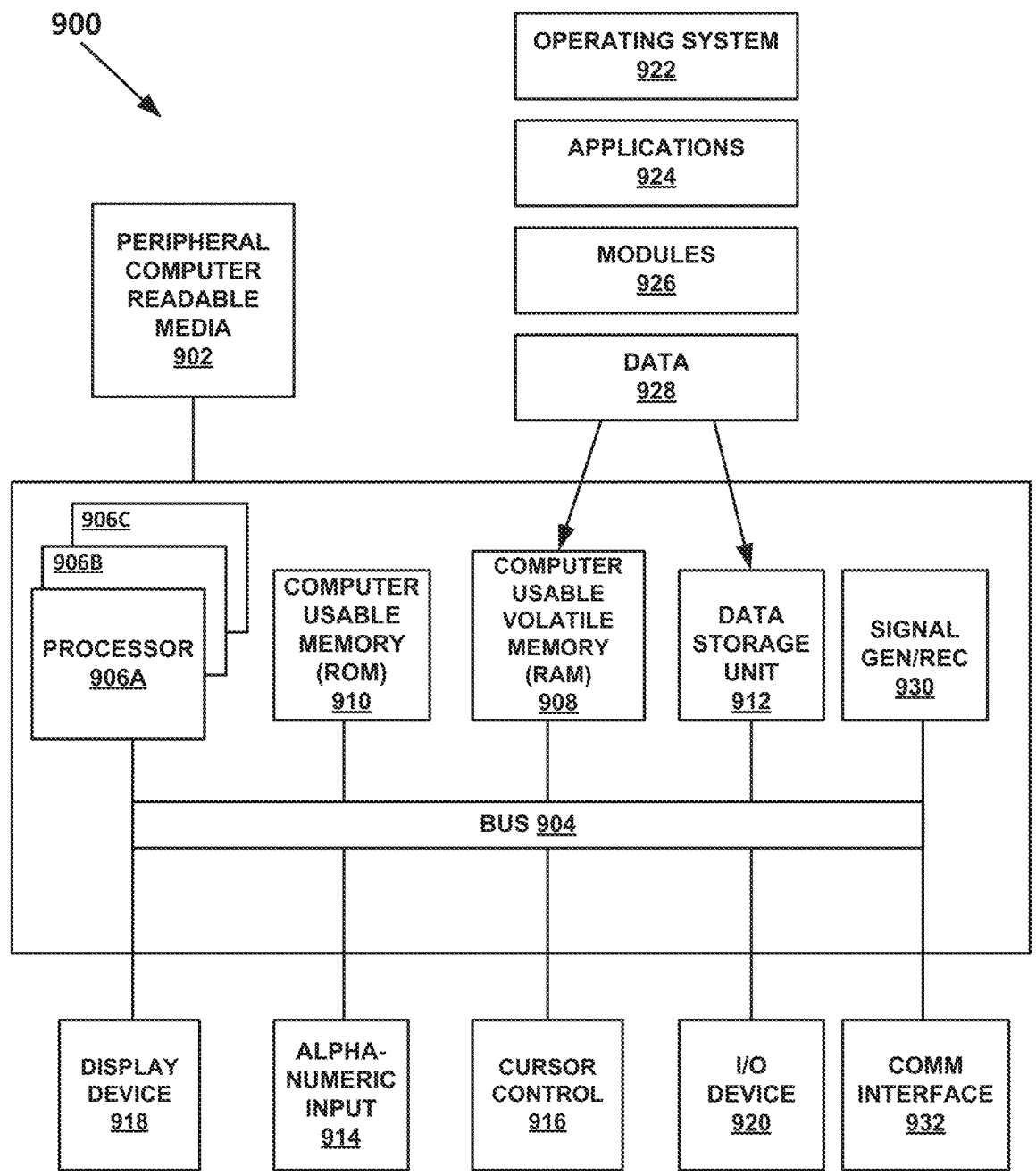
FIG. 9 is a block diagram of an example computer system with which or upon which various embodiments of the present invention may be implemented.

Mobile device 101 can include a display 918, one or more processors 906A-906C, and one or more of the components described in detail in the description of FIG. 9. Offer 105 can be a reward certificate, sales promotions, coupons, percentage discounts, reward dollar amounts, or the like. Offer 105 will also include a scanable code 106.

In one embodiment, mobile device 101 has a positioning determining system 104. Position determining system 104 is able to determine a specific location such as via a GPS or other location system, or determine location within a given radius, such as the broadcast range of a beacon, WiFi hotspot, overlapped area covered by a plurality of mobile telephone signal providers, or the like.

Network 115 is a wired or wireless network such as the Internet, a wide area network (WAN), local area network (LAN), or the like. A wired network can include Ethernet cable(s), phone line(s), router(s), switch(es), and the like. Wireless communication network examples include: WiFi, Cellular, Bluetooth, NFC, and the like.

In one embodiment, server 120 is a server that includes memory, processors, applications, operating systems and the like. Server 120 can communicate with mobile device 101 on a secure channel via network 115. In one embodiment, server 120 is responsible for data accessed by the customer loyalty application operating on mobile device 101 and can include the customer database that stores purchase, payment, and other store details. For example, server 120 can securely store mobile credit purchase information, such as the date, time, physical location, etc. when the offer was positively accepted, when the mobile payment has been made, and the like. Further, server 120 can be the repository for store metric information collected by the listening application and the location that performs the evaluation of the store metric information.

With reference now to FIG. 2, a flowchart 200 of a method for utilizing a listening application on a mobile device 101 to limit multiple redemptions of an offer is shown in accordance with an embodiment. The discussion of FIG. 2 will be made with reference to FIGS. 3A, 3B, 4A, and 4B.

Figure 3B:
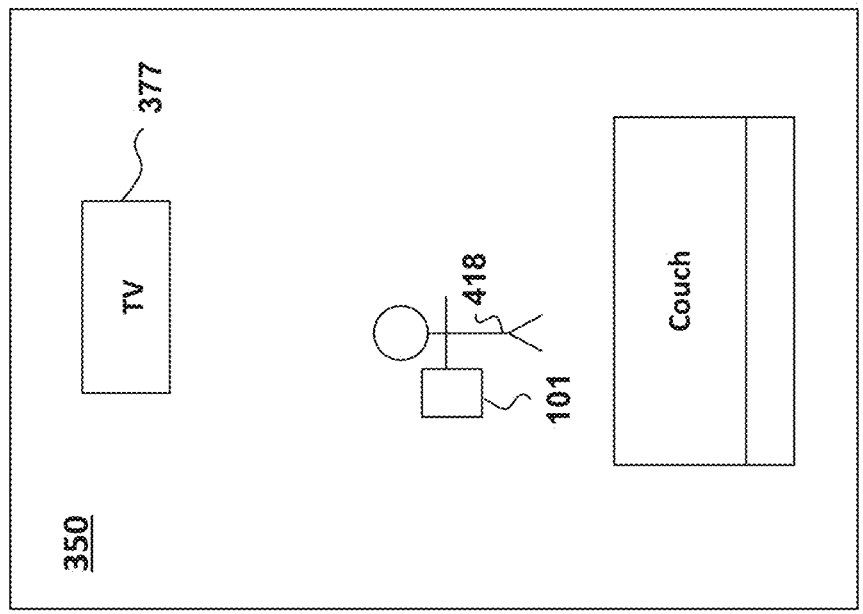
FIG. 3B is an illustration of the mobile device opening the offer in a non-retail environment, in accordance with an embodiment.
Figure 3A:
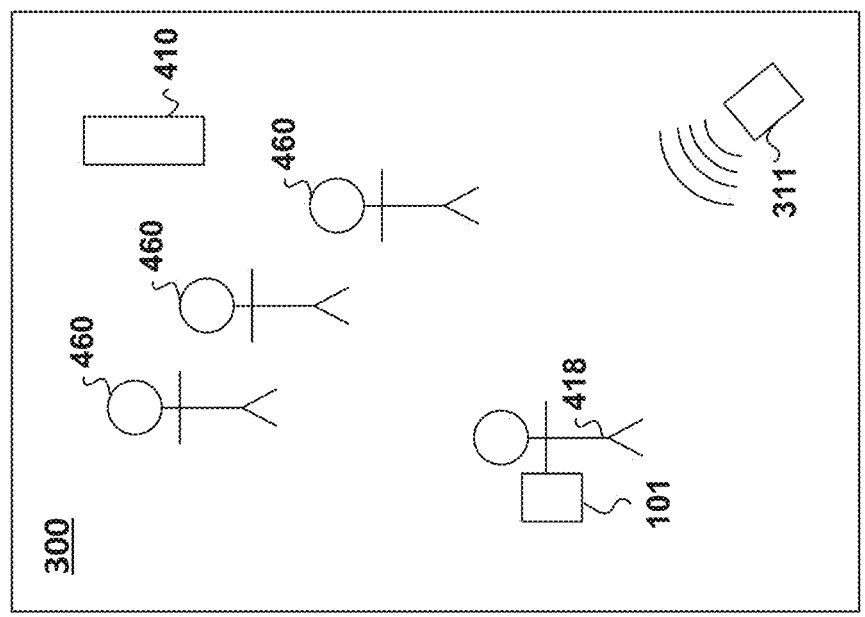
FIG. 3A is an illustration of the mobile device opening the offer in a retail environment shown in accordance with an embodiment.
Figure 4B:
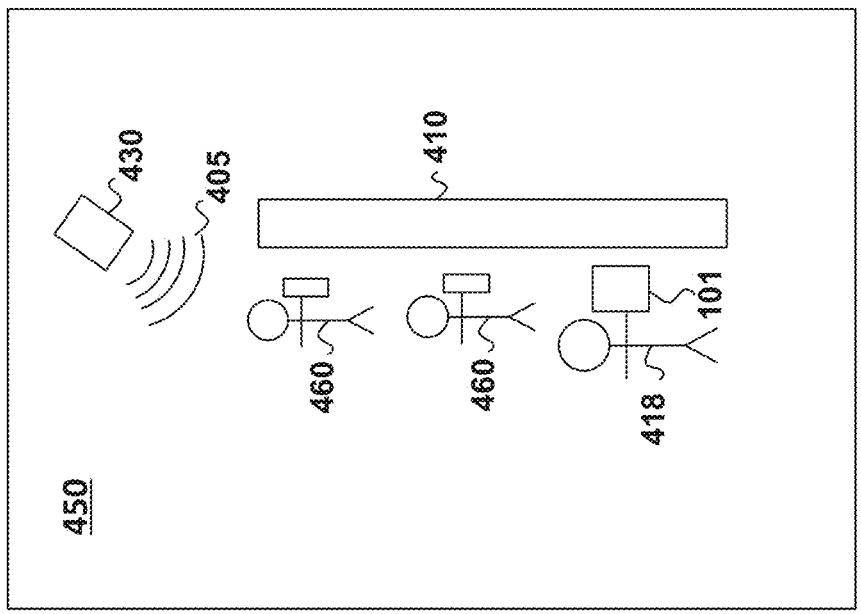
FIG. 4B is an illustration of a line at the POS with scanner sounds occurring for other than the offer on the mobile device, in accordance with an embodiment.
Figure 4A:
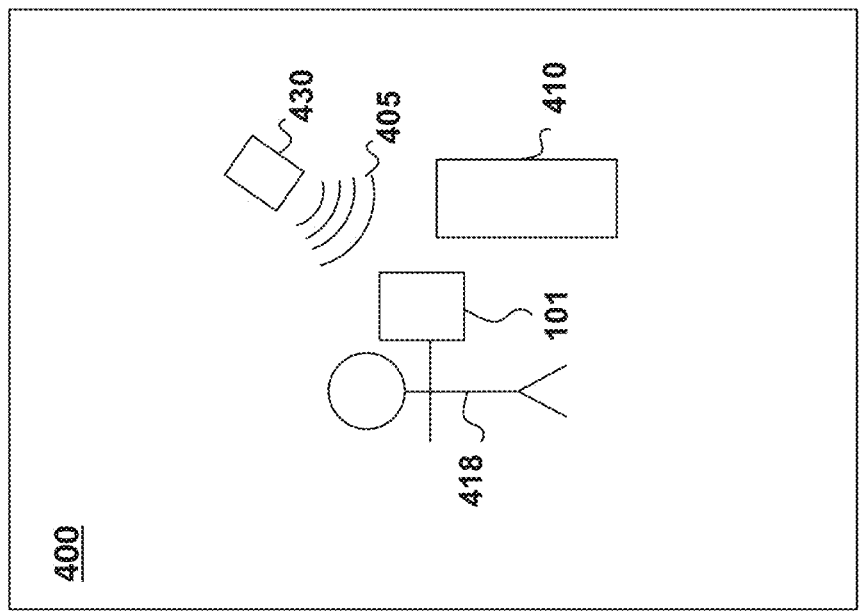
FIG. 4A is an illustration of a line at a POS with one or more scanner sounds occurring for the offer on the mobile device, in accordance with an embodiment.

FIG. 3A is an illustration of mobile device 101 opening offer 105 in a retail store 300 in accordance with an embodiment. FIG. 3B is an illustration of mobile device 101 opening offer 105 in a non-retail environment such as location 350, e.g., at home, in a vehicle, or the like, in accordance with an embodiment. FIG. 4A is an illustration of a POS 410 with a successful scanner sound 405 occurring for offer 105 on mobile device 101 in a retail store 400 in accordance with an embodiment. FIG. 4B is an illustration including a line of customers 460 at POS 410 with successful scanner sound 405 occurring for other than offer 105 on mobile device 101 in a retail store 450 in accordance with an embodiment.

Referring now to 205 of FIG. 2 and FIG. 1, one embodiment stores a listening application at a memory of a mobile device 101. Internal aspects of mobile device 101 are further described in FIG. 9 herein.

Mobile device 101 may be a mobile phone, a smart phone, a tablet, a smart watch, a piece of smart jewelry, smart glasses, or other electronic devices having wireless connectivity. That is, mobile device 101 would be capable of broadcasting and receiving via at least one network, such as, but not limited to, WiFi, Cellular, Bluetooth, NFC, and the like.

With reference now to 210 of FIG. 2 and FIG. 1, one embodiment accesses, with one or more processors, the offer on the mobile device 101. Offer 105 can be a reward certificate, sales promotions, coupons, percentage discounts, reward dollar amounts, and the like. The offers discussed herein are offers that are presented on display 918 of mobile device 101. The offer 105 can include a scanable code 106 such as a barcode, Universal Product Code (UPC), international article number (EAN), quick response code (QR), 2D barcode, Datamatrix code, Aztec code, and the like. In general, the scanable code 106 allows the offer 105 to be scanned by a scanning device.

Referring now to 215 of FIG. 2 and FIG. 1, one embodiment opens, with the one or more processors, the listening application when offer 105 is accessed.

With reference now to 220 of FIG. 2 and FIG. 1, one embodiment accesses, with the one or more processors, microphone 103 of mobile device 101.

Referring now to 225 of FIG. 2 and FIG. 1, one embodiment presents the offer 105 on display 918 of mobile device 101. The display of offer 105 will include the display of scanable code 106.

With reference now to 230 of FIG. 2 and FIGS. 3A and 3B, one embodiment listens, via microphone 103, for one or more sounds occurring in an environment about mobile device 101. For example, when offer 105 is displayed on mobile device 101, the listening application will listen for sound from the environment. That is, an application on mobile device 101 will be accessed by the user to open or present offer 105. When the offer is opened on mobile device 101, the listening application operating thereon will obtain access to microphone 103 of the mobile device and use microphone 103 to listen to the environment. For example, listening for the sounds can be listening for specific frequencies and patterns of frequency, listening for one or more of a library of sounds, and the like. In one embodiment the application identifies the dominant sound. For example, the dominant sound may be the sound that is loudest and/or closest to the device. In addition, one embodiment measures the frequency and the pattern of frequency changes of the dominant sound.

Referring now to 235 of FIG. 2 and FIG. 1, one embodiment accesses, with the one or more processors, a database 110 of sound files, each sound file in the database of sound files include a sound and an identifier tag to identify the sound. For example, database 110 of sound files could include the standard scanner/POS libraries and can be expanded as needed. For example, if a retailer utilizes a different type of device for the scanning, and chooses their own personalized sounds based on the "positive" and "negative" scanning, those personalized sounds (along with the underlying meaning of the sounds) would be added to the database 110 of sound files. As such, the database 110 of sound files utilized by the listening application can be expanded and/or contracted as needed similar to a whitelist. In one embodiment, database 110 of sound files can be stored as part of the application on mobile device 101. As such, mobile device 101 would not need any network 115 connectivity to access database 110 of sound files. In another embodiment, database 110 of sound files can be separate from mobile device 101 and accessed via network 115.

With reference now to 240 of FIG. 2 and FIGS. 3A-4B, one embodiment compares, with the one or more processors, the one or more sounds occurring in the environment with one or more sound files in the database of sound files. For example, when the listening application hears a scanner sound (e.g., a sound generated due to the actions of a scanning device) it will compare the scanner sound with a library of scanner sounds. For example, the application would access database 110 having the same scanner sounds and their associated identifiers as those used in the retail environment. Using the above example, one embodiment compares the frequency change pattern to the library of sounds.

When a match is made between the heard scanner sound and the database of scanner sounds, the identifier for the matching scanner sound will be returned. The identifier will indicate the result of the scan and that result will be used by the listening application. For example, a "negative" sound will cause the listening application to not expire the offer. In contrast, a "positive" sound will cause the listening application to begin the expiration process for the offer, as described in further detail herein.

In one embodiment, the listening application will also listen for ambient sounds during activation. In general, the listening application can listen for ambient sounds prior to the offer being displayed on display 918 of mobile device 101. Moreover, the detection and determination of ambient sounds may cause a delay in the offer being presented, in an expiration timer being added to the offer, or the like.

In general, when the listening application hears an ambient sound (e.g., the sounds in the background) it will compare the heard ambient sound with a library of ambient sounds. For example, the application would access database 110 having a number of ambient sounds and their associated identifiers, e.g., ambient sounds such as crowd noise, background noise, a music track, traffic noise, and the like. As such, when an ambient sound is heard, the listening application will compare the ambient sound with ambient sounds in database 110. When a match is made between the heard ambient sound and one or more of the ambient sounds in database 110, the identifier for the matching ambient sound will be returned.

The identifier will provide insight into the location of the device and will be used by the listening application accordingly. For example, if no significant ambient sound is heard (e.g., the user is in a car, living room, etc.) the identifier would be a "quiet area" such as a home, vehicle, or the like as shown in FIG. 3B. That is, a location 350 that is likely not a retail store. As such, the listening application would not expire offer 105 or start an expiration timer for offer 105. In contrast, if crowd noise is heard, the identifier would be crowd noise such as a store 300 environment which would cause the listening application to start an expiration timer for the offer, as described herein.

Referring now to 245 of FIG. 2 and FIG. 4B, one embodiment determines, with the one or more processors and based on the comparing, that a successful scanning sound 405 (e.g., a positive scanning sound) has been heard from scanning device 430 at POS 410. For example, if a "positive" sound is heard from the scanning device 430 it will denote that offer 105 on mobile device 101 has been utilized. In another embodiment, such as shown in FIG. 4A, the listening application will listen to ambient background noise. The background noise could provide additional information that would be used to confirm offer 105 use or lack thereof.

In one embodiment, ambience music instruments in store will have a sound frequency which matches to configured scanner tone. It would be hard to differentiate these types of sound frequencies to that of scanner tone. One solution would be to separate all different sound sources and find out the power (or intensity) associated with each of them.

With reference now to 250 of FIG. 2 and FIG. 4B, one embodiment expires, with the one or more processors, offer 105 on mobile device 101 when it is determined that the successful scanning sound 405 has been heard. In one embodiment, the expiration of offer 105 could be instant when the successful scanning sound 405 is heard. For example, one embodiment executes a command when the frequency change pattern matches one of the sounds in the library of sounds. For example, in some cases, the sound emanating from the 2D barcode scanner is 2,600 Hz. As such, in one embodiment, if the 2,600 Hz sound is heard, the coupon is validated and expired.

In one embodiment, the expiration process for offer 105 could include a timer that starts when successful scanning sound 405 is heard; the timer could be used to ensure that the successful scanning sound 405 was not for another customer 460 in front of user 418, in a different checkout lane, or the like.

For example, the user opens offer 105 on mobile device 101 when it is first received. By listening to the ambient background noise, the application could compare what is heard with a repository of sounds at database 110. For example, if little or no noise is heard in the background the application would determine that offer 105 was not opened in a store 300 (of FIG. 3A) but instead at a quieter location 350 (of FIG. 3B) such as a user's home, vehicle, or the like.

In another example, the background noise could include a musical track 311. The application could compare the musical track 311 with the musical track that is being played by the store 300 where offer 105 could be redeemed. If the music track 311 is a match, the application would determine that offer 105 was opened on mobile device 101 at the store 300. In one embodiment, the matching of the background music track 311 would result in an offer expiration timer being started. For example, the application could confirm that offer 105 was opened at store 300 and, as such, provide indications that offer 105 will only remain valid for the next x-minutes. User 418 would have to present offer 105 at POS 410 prior to the time expiring. In one embodiment, the time of validity could be set such that user 418 would not feel rushed, but would also not be able to save offer 105 for a second use. One example of the time of validity is 30 minutes. However, it should be appreciated that the time of validity can vary by retailer, by offer, or the like. The use of 30 minutes is merely one of a plurality of possible time periods. For example, the time of validity could be reduced to 10 minutes if it is a sizeable offer, or lengthened out to 45 minutes if store 300 knows the customers often average 45 minutes in the store shopping prior to making a purchase at POS 410

In one embodiment, as shown in FIG. 3A, the background noise could pick up sounds that would indicate that user 418 is in a busy location, e.g., store 300 is crowded, there is a line waiting for POS 410, etc. At the same time, the application would hear the "positive" sound of a scanning device. Based on the "busy" background noise, the app could surmise that the "positive" scanner sounds that are heard may or may not be from user 418.

For example, as shown in further detail in FIG. 4B, the successful scanning sound 405 may be from a different customer 460 in the line for POS 410 or a different POS. As such, in one embodiment, the application would again provide an expiration timer being started. For example, the application could confirm that offer 105 was opened at store 300 and in the checkout line, and as such provide indications that offer 105 will only remain valid for the next y-minutes prior to offer 105 expiring. In one embodiment, the time of validity could be 2-10 minutes. As such, user 418 would not lose the ability to utilize offer 105 due to the successful scanning sound 405 emitted for other customers 460, but would also not be able to save offer 105 for further use after the y-minute time period expired.

In one embodiment, there may be a state created by the listening application prior to the presentation of offer 105 on mobile device 101 when significant background noise is heard. For example, in FIG. 4B, the user is in a line at POS 410 and there are other customer's 460 that are ahead of the user. When the user accesses offer 105 on mobile device 101, the listening application would begin to listen prior to the presentation of offer 105 on display 918 and determine that there is significant ambient noise, scanner noises, and the like. As such, the listening application would provide a signal to the offer presentation application. The signal could be indicative of the offer presentation application to provide a first interactive screen 476, e.g., a confirmation step, prior to the presentation of offer 105 on display 918. The first interactive screen 476 would inform the user that when the user is ready to present offer 105 for scanning, the user will have to take the confirmation step, e.g., touch an icon, use a touch ID, select an icon, or otherwise interact with the first interactive screen 476 on the mobile device before the actual offer 105 is presented on display 918 of mobile device 101. Then, when the user does perform the confirmation step, offer 105 is presented on display 918.

For example, to prevent accidental validation of the coupon when 2,600 Hz is heard from other locations (such as a speaker, from a song, television, or the like), the user could be asked to perform a confirmation task, such as to hold down a button, which activates the listening component of the application and displays the barcode. In another embodiment, the location of the mobile device could be cross-referenced via the GPS coordinates to ensure the person is in a store before activating the sound component. In one embodiment, if the user removes their finger from the button, the barcode will become hidden and the listener will shut off.

In one embodiment, once offer 105 is displayed and successful scanning sound 405 is heard, the listening application would consider offer 105 to have been used and offer 105 would no longer be valid. In another embodiment, once offer 105 is displayed and successful scanning sound 405 is heard, the listening application would not initially disable offer 105, and instead will start a timer that will cause offer 105 to expire after a certain time period. In one embodiment, the expiration time period for offer 105 can be pre-defined. For example, some offers may expire instantly when the scanning is heard, while other offers will expire some time period after the scanning sound is heard. In one embodiment, after offer 105 is used or the time period for offer 105 has tolled, offer 105 would no longer be displayable on mobile device 101.

In one embodiment, the listening application on mobile device 101 is related to the offer being presented. For example, the application is a brand's application, such as a loyalty application, that is providing offer 105. In one embodiment, the listening application is used behind a loyalty application. That is, the listening application can activate when the loyalty application is accessed to monitor a confirmation sound from POS 410 scanning device 430. In one embodiment, the listening application is not only used by the loyalty application to determine that offer 105 has been used, but also to obtain a "confirmation" sound that would indicate that a mobile payment has been made, (e.g., the scanning of the mobile virtual card), etc. The "confirmation" sound can be used to update chargeback procedures and rules. Moreover, the application will record additional information such as, the date, time, physical location, etc. when offer 105 is positively accepted, when the mobile payment has been made, and the like. As such, the loyalty application would be able to provide detailed information about the redemption of offer 105, which includes user 418 purchase information, to a customer database at server 120.

In so doing, the customer database at server 120 would be able to tie the redemption of offer 105 to a specific purchase. In one embodiment, the customer database at server 120 would be able to tie the redemption of offer 105 to a specific purchase at a specific date. In yet another embodiment, the customer database would be able to tie the redemption of offer 105 to a specific purchase at a specific location on a specific date. By tying the redemption of offer 105 to a purchase, the information would be valuable for determining future offers, for tracking the offers that were redeemed by user 418, to provide identification of the redeemed offer 105 in the case that one or more parties disputes that offer 105 was redeemed, and the like.

In one embodiment, offer 105 may be incorrectly expired, due to an issue such as the offer being viewed at home, e.g., quiet location 350 of FIG. 3B, and the TV 377 in the background causing the listening application to determine the user 418 is in the store which causes an expiration timer to start and offer 105 to expire before it is actually utilized. If offer 105 is improperly expired, e.g., before offer 105 was actually used by user 418, user 418 will be able to contact the offer provider and then the customer database at server 120 would be able to tell if user 418 had or had not used offer 105. If offer 105 was improperly expired, offer 105 could be re-activated on mobile device 101. In one embodiment, the contacting of the offer provider could be done via telephone, in store, at a kiosk, using the application that provided offer 105, or the like.

Additional Features:

If a user 418 applies for a new account, when the new account if provided, the listening application could listen for ambient sounds to make a determination as to whether or not the user is in store 300. If the ambient sounds allow the listening application to make the determination that the user is in store 300, then the listening application would provide a signal to the new account to provide the user with a temporary shopping pass. However, if the ambient sounds allow the listening application to make the determination that the user is not in store 300, then the listening application would provide a signal to the new account to not provide the user with a temporary shopping pass at the present time, or not allow the user to access the mobile virtual card, as the user is not in an environment in which the temporary pass or virtual card could properly be used.

In one embodiment, the ambient sound picked up by the listening application is used to provide store metric information. For example, a quiet store at time A, a busy store at time B, checkout time at the POS, etc. The listening application could access location information, such as via a location determiner such as position determining system 104, to determine the store location and then provide the store metric information to the retail establishment. By receiving the store metrics from one or a plurality of different mobile devices using the listening app at different times, on different days, etc. The store metric information would be useful in determining peak and lull traffic times at the store, adjust employee staffing based on the peak traffic times. Etc.

Further, the customer traffic determined from the store metric information can be used to rearrange staffing at call center. For example, if there is a spike in shopping then there will likely follow a spike in customer call center calls some period after the shopping spike.

The store metric information could further be used by the retailer to determine if the higher customer traffic times correlates with higher levels of sales. The store metric information would also be useful in the development of a heat map to determine high traffic days, to determine low traffic days, to determine when marketing would be best used to increase customer traffic, etc. Thus, the store metric information could be used to determine the overall health of the store.

FIGS. 5A-5E are screen shots 500-540 of the application flow across a plurality of screens of the mobile device 101, in accordance with an embodiment. At FIG. 5A screen shot 500 shows a landing page of a credit account page is shown after the user logs in. In one embodiment, at some location on the landing page there will be a coupon/code selection icon 503. Once icon 503 is selected, one or more coupons and/or codes will be presented on the display.

Figure 5C:
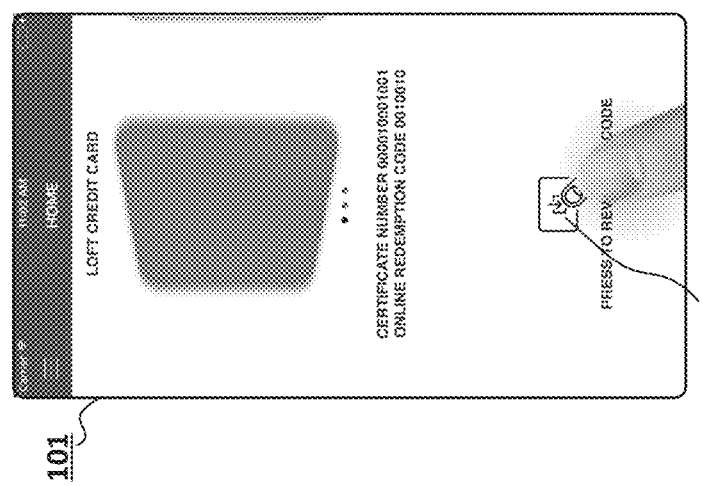
FIGS. 5A-5E are screen shots of an application flow across a plurality of screens of the mobile device, in accordance with an embodiment.
Figure 5B:
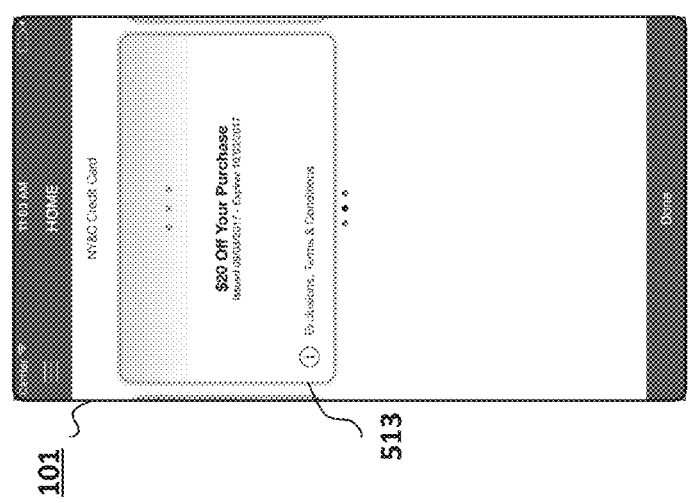
Figure 5A:
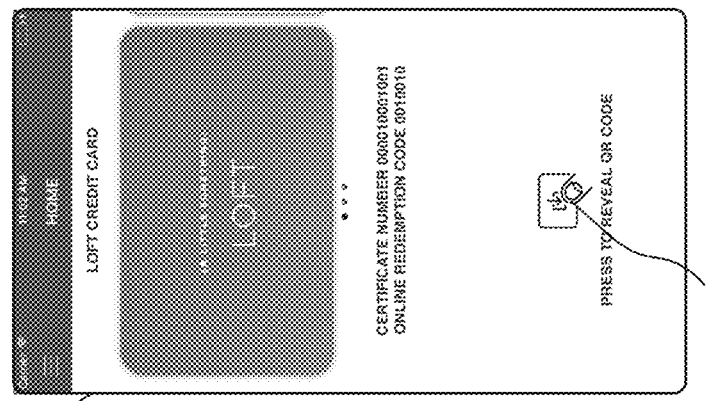

At FIG. 5B screen shot 510 shows a page where the user can swipe, scroll, or otherwise navigate through the one or more coupons 513.

At FIG. 5C screen shot 520 shows the display 918 after the coupon is selected by the user. In one embodiment, at some location on coupon display page 520 there will be a coupon/code reveal icon 523. In general, the coupon/code reveal icon 523 will be selected by the user when the user is ready to present the coupon to the retailer for the purchase.

Figure 5E:
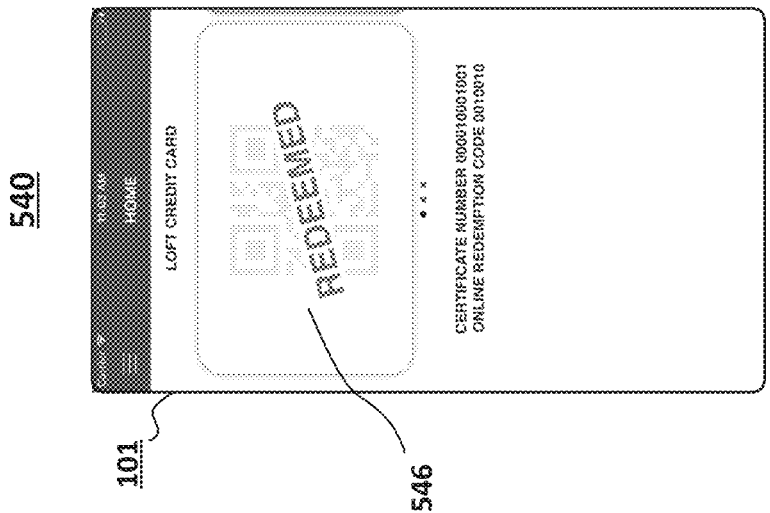
Figure 5D:
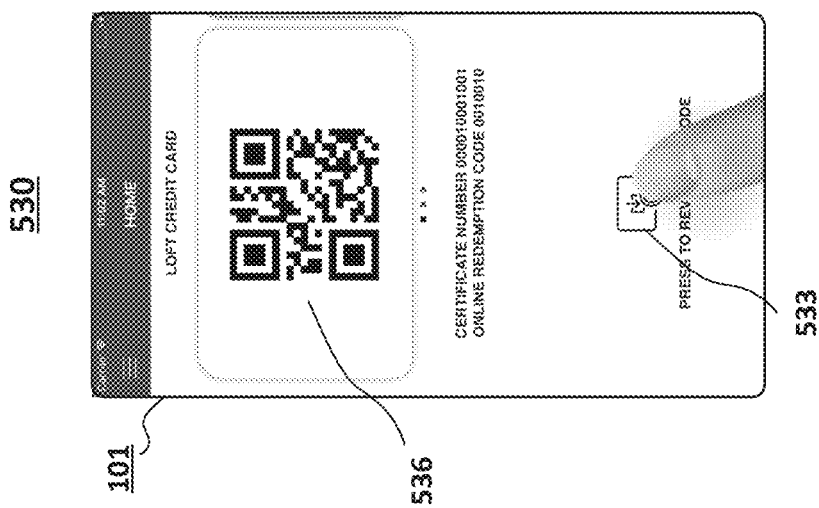

At FIG. 5D screen shot 530 shows the coupon/code 536 revealed on the display 918 of mobile device 101. In one embodiment, screen 530 will also include an optional presentation icon 533 that may be used when the environment is noisy, a delay is needed, or other such reasons as described herein which may include starting a timer, etc. In one embodiment, hitting optional presentation icon 533 will begin the timer, confirm the coupon use, etc.

At FIG. 5E screen shot 540 shows the coupon/code as being redeemed 546 on the display 918 of mobile device 101.

Figure 6:
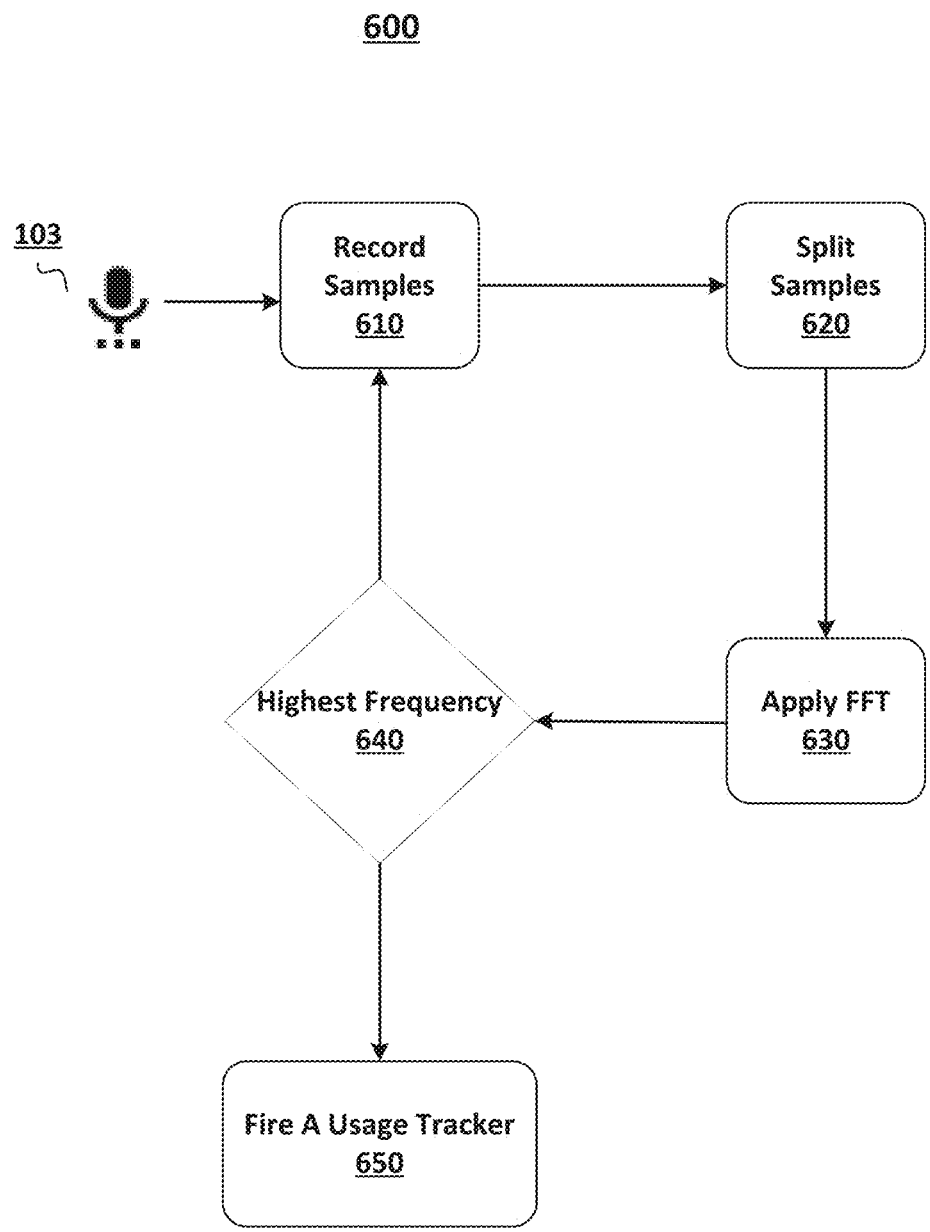
FIG. 6 is a flow diagram of a sound capture process, in accordance with an embodiment.

Referring now to FIG. 6, a flow diagram of a sound capture process 600 is shown in accordance with an embodiment. As described herein, most of the scanner equipment generally used in stores today, creates a tone of successful scanning at a given frequency (in this example we will use the frequency of approximately 2610) however, there is no defined standard as such the use of the 2610 frequency herein is merely for purposes of clarity. The sound that is listened for could be a different frequency, set or frequencies, or the like.

Sound capture process 600 includes a microphone 103 as described in FIG. 1. Further, microphone 103 will record and capture sound at different times and different levels as described herein. For example, in one embodiment, microphone 103 will record surrounding sounds when the coupon code is presented on the display such as shown in FIGS. 1 and 5D.

Referring now to 610 of FIG. 6, one embodiment records environmental sound samples via microphone 103. In one embodiment, microphone 103 has a sampling rate of 44.1K. However, it should be appreciated that the sampling rate could be different than 44.1K. The use of 44.1K is provided herein for purposes of clarity. In one embodiment, audio samples are taken from the front microphone 103 on mobile device 101 so as to sample clearly. However, it should be understood that the use of the front microphone 103 is also provided as one example for purposes of clarity. It should be appreciated that a back microphone 103, a side microphone 103, a top microphone 103, a bottom microphone 103, or a combination thereof may be utilized to take the audio samples.

With reference now to 620 of FIG. 6, one embodiment splits the samples. The samples may be split into frames, etc. For example, in one embodiment, the recorded samples are split into multiples of 512 byte frames. In one embodiment, the recorded sounds are split from a recorded buffer that mixes 2 channel samples.

Referring now to 630 of FIG. 6, one embodiment applies fast Fourier transform (FFT) on each of the audio samples and extracts peak frequency in that range of samples.

With reference now to 640 of FIG. 6, in one embodiment a check of the highest frequency is made. For example, the library will check if highest frequency in that buffer is around 2600~2610K.

Referring now to 650 of FIG. 6, one embodiment fires a usage tracker to record current location and time of the recording. In one embodiment, a usage tracker API is used.

Figure 7:
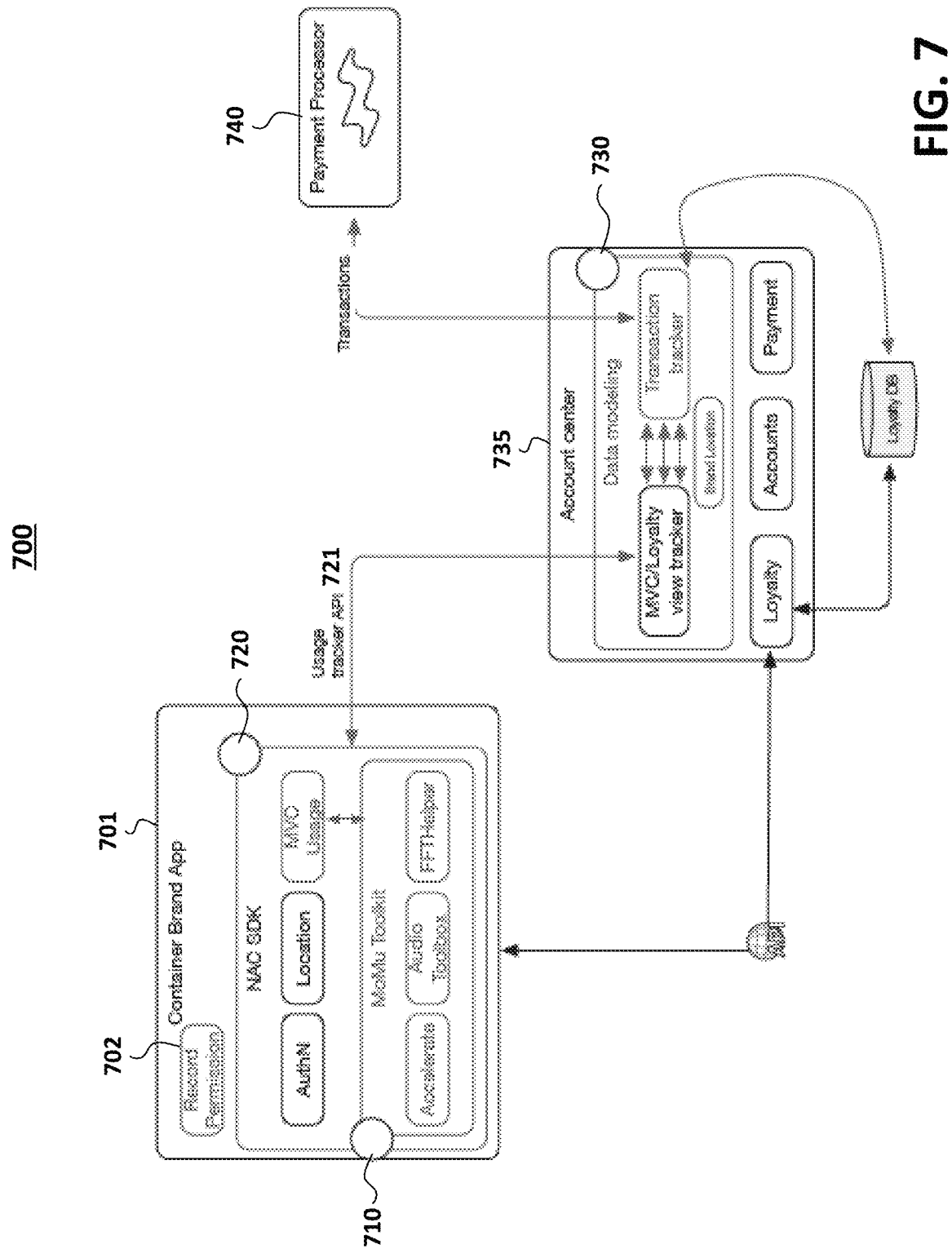
FIG. 7 is a block diagram of an exemplary architecture within which the sound capture process will operate, in accordance with an embodiment.

With reference now to FIG. 7, a block diagram of an exemplary architecture 700 within which the sound capture process will operate is shown in accordance with an embodiment. In one embodiment, the exemplary architecture 700 is part of a mobile loyalty solution. In so doing, exemplary architecture 700 will bring in audio recognition library to native account center (NAC) software development kit (SDK) and the listening/redemption feature to an account center server.

Diagram 700 includes record permission 702, mobile multimedia toolkit (MoMu) 710, NAC SDK 720, data modeling 730, and payment processor 740.

Record permission 702 will provide authorization by the user of the mobile device for the application to record the ambient sounds. For example, a situation when the user does not provide permission for recording. In this case, the application 701 has to educate customers to provide permission. In one embodiment, redirecting user to OS settings in case of iOS, will result in application restart. Thus a user may have to authenticate again.

In one embodiment, MoMu 710 is used to identify scanner code (sounds). In one embodiment, MoMu 710 utilizes the audio library to identify the scanner sounds. This toolkit can have wrapper code for low level audio toolbox framework and accelerate framework. This base tool kit can also be improved for calculating individual audio source intensity for better results in capturing scanner tone. In one embodiment, audio recognition library will expose main functions like "Start recording", "Stop recording". Audio recognition library will also take configurable parameters like audio sample rate, frequency of interest.

NAC SDK 720 NAC library will display the coupon code appropriately on mobile device 101 when the user is ready for the display to be scanned. NAC SDK will register a call back function to be called once configured frequency range is found in audio frame. It is responsibility of container app to ask for necessary record permission along with appropriate message to customer. If necessary permissions are not available NAC SDK should direct the user to settings app. NAC will take care of brand specific MVC and loyalty coupon display. QR code will be revealed once user touches the screen. Library will send call back whenever it encounters with scanner frequency. NAC library will send usage tracking call along with brand, location and time.

This may be followed with touch ID authentication. Once MVC screen or loyalty screen is on display, it will also start audio recording and scanning for scanner tone. Each time NAC detects a scanner tone it will send a usage tracker report to the sound modeling module via usage tracker API 721.

In one embodiment, usage tracker API 721 will collect information such as some, or all, but not limited to: a participating brand name; user/device location when coupon/code is revealed; timestamp with time zone when coupon/code is revealed by mobile device 101; a duration of time that the coupon/code was revealed (in one embodiment, this is measured when a user touches the screen to reveal coupon/code, until either there is a scan tone recognition or until user touch is ended); a type of the coupon/code (e.g., MVC, Loyalty, etc.); isScanDetected: a value that indicates the scan tone was heard; a userid (e.g., mobile card holder identification, etc.). Usage tracker will typically send a post such as:

```
{
    "brand": "Aspire",
    "location": {
        "lat": 13.2,
        "long": 80.7,
    },
    "timestamp": "27 Nov 2017 20:20:27 EST",
    "duration": 3000,
    "type": "MVC",
    "isScanDetected": true,
    "userId": <userid>
}
```

In one embodiment, data modeling 730 is implemented in account center 735 which may be a server. Data modeling 730 will model data from 2 independent sources and arrive at appropriate conclusion on loyalty certificates. These sources are "usage tracker API" from N NAC SDK 720 and "transaction tracker API" from payment processors 740. The transaction tracker will typically send information:

```
{
    "brand": "Aspire",
    "transaction type": "MVC",
    "timestamp": "27 Nov 2017 20:20:27 EST",
    "cardusermapingid": <userid>
}
```

Figure 8:
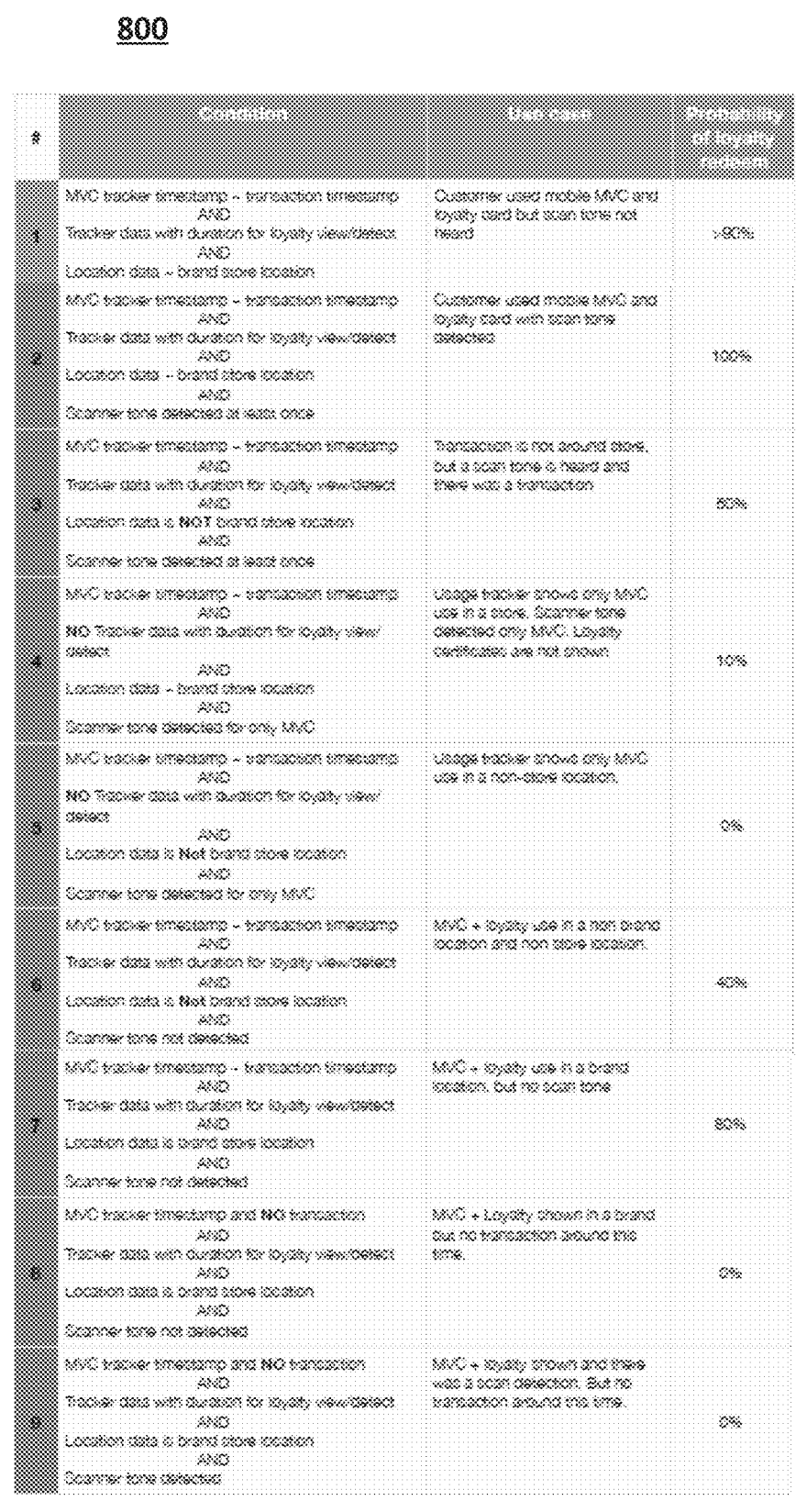

Referring now to FIG. 8, a table 800 of 9 different use cases that include the condition, the use case and the probability of coupon/code redemption is shown in accordance with one embodiment. In one embodiment, the probability of loyalty redeem may be:

80%-99%→Allow store manager to make decision and mark as redeemed.

50%-79%→Allow one time redemption.

below 50%→Allow redemption.

Example Computer System Environment

With reference now to FIG. 9, portions of the technology for providing a communication composed of computer-readable and computer-executable instructions that reside, for example, in non-transitory computer-readable storage media (medium) of a computer system. That is, FIG. 9 illustrates one example of a type of computer that can be used to implement embodiments of the present technology. FIG. 9 represents a system or components that may be used in conjunction with aspects of the present technology. In one embodiment, some or all of the components described herein may be combined with some or all of the components of FIG. 9 to practice the present technology.

FIG. 9 illustrates an example computer system 900 used in accordance with embodiments of the present technology. It is appreciated that system 900 of FIG. 9 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 9, computer system 900 of FIG. 9 is well adapted to having peripheral computer readable media 902 such as, for example, a disk, a compact disc, a flash drive, and the like coupled thereto.

Computer system 900 of FIG. 9 includes an address/data/control bus 904 for communicating information, and a processor 906A coupled to bus 904 for processing information and instructions. As depicted in FIG. 9, system 900 is also well suited to a multi-processor environment in which a plurality of processors 906A, 906B, and 906C are present. Conversely, system 900 is also well suited to having a single processor such as, for example, processor 906A. Processors 906A, 906B, and 906C may be any of various types of microprocessors. Computer system 900 also includes data storage features such as a computer usable volatile memory 908, e.g., random access memory (RAM), coupled to bus 904 for storing information and instructions for processors 906A, 906B, and 906C.

System 900 also includes computer usable non-volatile memory 910, e.g., read only memory (ROM), coupled to bus 904 for storing static information and instructions for processors 906A, 906B, and 906C. Also present in system 900 is a data storage unit 912 (e.g., a magnetic disk drive, optical disk drive, solid state drive (SSD), and the like) coupled to bus 904 for storing information and instructions. Computer system 900 also includes an optional alpha-numeric input device 914 including alphanumeric and function keys coupled to bus 904 for communicating information and command selections to processor 906A or processors 906A, 906B, and 906C. Computer system 900 also includes an optional cursor control device 916 coupled to bus 904 for communicating user input information and command selections to processor 906A or processors 906A, 906B, and 906C. Optional cursor control device may be a touch sensor, gesture recognition device, and the like. Computer system 900 of the present embodiment also includes an optional display device 918 coupled to bus 904 for displaying information.

Referring still to FIG. 9, optional display device 918 of FIG. 9 may be a liquid crystal device, cathode ray tube, OLED, plasma display device or other display device suitable for creating graphic images and alpha-numeric characters recognizable to a user. Optional cursor control device 916 allows the computer user to dynamically signal the movement of a visible symbol (cursor) on a display screen of display device 918. Many implementations of cursor control device 916 are known in the art including a trackball, mouse, touch pad, joystick, non-contact input, gesture recognition, voice commands, bio recognition, and the like. In addition, special keys on alpha-numeric input device 914 capable of signaling movement of a given direction or manner of displacement. Alternatively, it will be appreciated that a cursor can be directed and/or activated via input from alpha-numeric input device 914 using special keys and key sequence commands.

System 900 is also well suited to having a cursor directed by other means such as, for example, voice commands. Computer system 900 also includes an I/O device 920 for coupling system 900 with external entities. For example, in one embodiment, I/O device 920 is a modem for enabling wired or wireless communications between system 900 and an external network such as, but not limited to, the Internet or intranet. A more detailed discussion of the present technology is found below.

Referring still to FIG. 9, various other components are depicted for system 900. Specifically, when present, an operating system 922, applications 924, modules 926, and data 928 are shown as typically residing in one or some combination of computer usable volatile memory 908, e.g. random access memory (RAM), and data storage unit 912. However, it is appreciated that in some embodiments, operating system 922 may be stored in other locations such as on a network or on a flash drive; and that further, operating system 922 may be accessed from a remote location via, for example, a coupling to the interne. In one embodiment, the present technology, for example, is stored as an application 924 or module 926 in memory locations within RAM 908 and memory areas within data storage unit 912. The present technology may be applied to one or more elements of described system 900.

System 900 also includes one or more signal generating and receiving device(s) 930 coupled with bus 904 for enabling system 900 to interface with other electronic devices and computer systems. Signal generating and receiving device(s) 930 of the present embodiment may include wired serial adaptors, modems, and network adaptors, wireless modems, and wireless network adaptors, and other such communication technology. The signal generating and receiving device(s) 930 may work in conjunction with one or more communication interface(s) 932 for coupling information to and/or from system 900. Communication interface 932 may include a serial port, parallel port, Universal Serial Bus (USB), Ethernet port, Bluetooth, thunderbolt, near field communications port, WiFi, Cellular modem, or other input/output interface. Communication interface 932 may physically, electrically, optically, or wirelessly (e.g., via radio frequency) couple computer system 900 with another device, such as a mobile phone, radio, or computer system.

The computing system 900 is only one example of a suitable computing environment and is not intended to suggest any limitation as to the scope of use or functionality of the present technology. Neither should the computing environment be interpreted as having any dependency or requirement relating to any one or combination of components illustrated in the example computing system 900.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for utilizing a listening application on a mobile device to limit multiple redemptions of an offer, the method comprising:
   storing, at a memory of a mobile device, the listening application;
   accessing, with one or more processors on the mobile device, the offer;
   opening, with the one or more processors, the listening application when the offer is accessed;
   accessing, with the one or more processors, a microphone of the mobile device;
   listening, via the microphone after the offer is accessed and prior to the offer being displayed on a display of the mobile device, for one or more ambient sounds occurring in an environment about the mobile device;
   accessing, with the one or more processors, a database of sound files,
      each sound file in the database of sound files comprising:
         a sound; and
         an identifier tag to identify the sound;
   comparing the one or more ambient sounds occurring in the environment with one or more sound files in the database of sound files;
   determining, based on the comparing, that the environment is a busy location;
   displaying a confirmation step prior to presenting the offer on the display when it is determined that the environment is a busy location;
   presenting the offer on a display of the mobile device after the confirmation step is taken;
   adding an expiration timer to the offer when it is determined that the environment is said busy location;

starting the expiration timer when the offer is presented on the display of the mobile device;
listening, via the microphone, for one or more sounds occurring in the environment about the mobile device;
comparing, with the one or more processors, the one or more sounds occurring in the environment with one or more sound files in the database of sound files;
determining, with the one or more processors and based on the comparing, that a successful scanning sound has been heard;
expiring, with the one or more processors, the offer on the mobile device when it is determined that the successful scanning sound has been heard to limit multiple redemptions of the offer; and
expiring the offer when the expiration timer is tolled regardless of whether or not the successful scanning sound has been heard.

2. The method of claim 1, further comprising:
determining, with the one or more processors and based on the comparing, that said successful scanning sound has not been heard; and
continuing the listening and comparing as long as the offer is displayed on the display of the mobile device.

3. The method of claim 1, wherein the ambient sounds are selected from a group of ambient sounds consisting of: a crowd noise, a background noise, a music track, and a traffic noise.

4. The method of claim 1, further comprising:
determining, based on the comparing, that a positive scanner sound has been heard after the offer is presented on the display of the mobile device;
starting a timer after the positive scanner sound has been identified; and
delaying the expiring of the offer until the timer is tolled.

5. The method of claim 1, further comprising:
listening, via the microphone after the offer is accessed and prior to the offer being displayed on the display, for said one or more ambient sounds occurring in said environment about the mobile device;
comparing the one or more ambient sounds occurring in the environment with said one or more sound files in the database of sound files;
determining, based on the comparing, that the environment is a quiet location; and
maintaining a validity of the offer when it is determined that the environment in which the offer has been presented is a quiet location regardless of whether or not the successful scanning sound has been heard.

6. The method of claim 1, wherein the offer is selected from the group consisting of: a reward certificate, a sales promotion, a coupon, a percentage discount, and a reward dollar amount.

7. The method of claim 1, further comprising:
accessing the offer from a loyalty application on the mobile device;
coupling the listening application to the loyalty application such that the listening application is activated whenever the loyalty application is accessed;
listening, via the microphone, for the one or more sounds occurring in the environment about the mobile device;
comparing the one or more sounds occurring in the environment with one or more sound files in the database of sound files;
determining, based on the comparing, that a successful mobile payment has been heard; and
denoting, with the loyalty application, a time and a date of the successful mobile payment.

8. The method of claim 7, further comprising:
accessing a location positioning system with the mobile device;
determining a location of the mobile device when the successful mobile payment has been heard;
denoting, at the loyalty application, a location of the successful mobile payment; and
combining a redemption of the offer to the time, the date, and the location of the successful mobile payment.

9. A non-transitory computer-readable medium storing instructions, the instructions comprising:
one or more instructions that, when executed by one or more processors, cause the one or more processors to:
access an offer for presentation on a display of a mobile device;
open a listening application,
the listening application automatically opened when the offer is accessed;
access a microphone of the mobile device;
listen, via the microphone after the offer is accessed and prior to the offer being displayed on the display, for one or more ambient sounds occurring in an environment about the mobile device;
access a database of sound files,
each sound file in the database of sound files comprising:
a sound; and
an identifier tag to identify the sound;
match the one or more ambient sounds occurring in the environment with one or more sound files in the database of sound files;
determine, based on the match, that the environment is a busy location;
display a confirmation step, prior to a display of the offer, on a display of the mobile device when it is determined that the environment is a busy location;
display the offer on the display of the mobile device after the confirmation step is taken;
add an expiration timer to the offer when it is determined that the environment is said busy location;
start the expiration timer when the offer is presented on the display of the mobile device;
listen, via the microphone, for one or more sounds occurring in an environment about the mobile device;
match the one or more sounds occurring in the environment with one or more sound files in the database of sound files;
determine, based on the match, that a successful scanning sound has been heard;
expire the offer when it is determined that the successful scanning sound has been heard to limit multiple redemptions of the offer; and
expire the offer when the expiration timer is tolled regardless of whether or not the successful scanning sound has been heard.

10. The non-transitory computer-readable medium of claim 9, wherein the ambient sounds are selected from a group of ambient sounds consisting of: a crowd noise, a background noise, a music track, and a traffic noise.

11. The non-transitory computer-readable medium of claim 9, where the one or more instructions, when executed by the one or more processors, further cause the one or more processors to:
start a timer when it is determined that the successful scanning sound has been heard; and
delay an expiration of the offer until the timer is tolled.

12. A mobile device comprising:
a display;
a microphone;
a memory having a listening application stored thereon; and
one or more processors, the one or more processors to:
   receive a request to access an offer for presentation on the display;
   automatically open a listening application based on the request;
   access the microphone based on the request;
   listen, via the microphone after the offer is accessed and prior to the offer being displayed on the display, for one or more ambient sounds occurring in an environment about the mobile device;
   access a database of sound files,
      each sound file in the database of sound files comprising:
         a sound; and
         an identifier tag to identify the sound;
   match the one or more ambient sounds occurring in the environment with one or more sound files in the database of sound files;
   determine, based on the match, that the environment is a busy location;
   display a confirmation step, prior to a display of the offer, on the display when it is determined that the environment is a busy location;
   display the offer on the display after the confirmation step is taken;
   add an expiration timer to the offer when it is determined that the environment is said busy location;
   start the expiration timer when the offer is presented on the display of the mobile device;
   listen, via the microphone, for one or more sounds occurring in an environment about the mobile device;
   match the one or more sounds occurring in the environment with one or more sound files in the database of sound files;
   determine, based on the match, that a successful scanning sound has been heard;
   expire the offer when it is determined that the successful scanning sound has been heard to limit multiple redemptions of the offer; and
   expire the offer when the expiration timer is tolled regardless of whether or not the successful scanning sound has been heard.

* * * * *